US012744780B2

(12) United States Patent
Fischman et al.

(10) Patent No.: US 12,744,780 B2

(45) Date of Patent: Sep. 22, 2026

(54) TWO PERSON CONTROL WHERE BOTH PARTIES ARE GEOGRAPHICALLY DISTRIBUTED

(71) Applicant: General Dynamics Mission Systems, Inc., Fairfax, VA (US)

(72) Inventors: Reuben S. Fischman, Rehoboth, MA (US); Bonha Koo, Cambridge, MA (US); Elzabeth Butler, North Easton, MA (US); Stephanie Saariaho, Bridgewater, MA (US)

(73) Assignee: General Dynamics Mission Systems, Inc., Fairfax, VA (US)

( * ) Notice: Subject to any disclaimer, the term of this patent is extended or adjusted under 35 U.S.C. 154(b) by 61 days.

(21) Appl. No.: 18/652,084

(22) Filed: May 1, 2024

(65) Prior Publication Data

US 2025/0343792 A1 Nov. 6, 2025

(51) Int. Cl.

| | |
|---|---|
| ***H04L 9/40*** | (2022.01) |
| ***G06Q 50/16*** | (2012.01) |
| *G06Q 20/02* | (2012.01) |
| *G06Q 20/38* | (2012.01) |
| *G06Q 30/06* | (2023.01) |
| *H04L 67/02* | (2022.01) |

(52) U.S. Cl.

CPC ............. *H04L 63/10* (2013.01); *G06Q 50/16* (2013.01); *H04L 63/04* (2013.01); *H04L 63/101* (2013.01); *H04L 63/105* (2013.01); *H04L 63/164* (2013.01); *H04L 63/20* (2013.01); *G06Q 20/02* (2013.01); *G06Q 20/3825* (2013.01); *G06Q 30/06* (2013.01); *H04L 67/02* (2013.01)

(58) Field of Classification Search

None

See application file for complete search history.

(56) References Cited

U.S. PATENT DOCUMENTS

| | | | | |
|---|---|---|---|---|
| 6,950,824 | B1 * | 9/2005 | Babiskin ............. | G06F 21/6227 707/999.1 |
| 8,401,938 | B1 * | 3/2013 | Chapman ........... | G06Q 20/3255 705/34 |
| 9,032,531 | B1 * | 5/2015 | Scorvo ................ | G06F 21/6254 726/25 |
| 11,423,164 | B2 * | 8/2022 | Bartlett ................. | G06F 21/645 |
| 11,443,322 | B2 * | 9/2022 | Shapiro ............. | G06Q 20/4097 |

(Continued)

*Primary Examiner* — Lashonda Jacobs-Burton

(74) *Attorney, Agent, or Firm* — Ingrassia Fisher & Lorenz, LLP

(57) ABSTRACT

Two party computer access control including a network interface for receiving, an initiate message including a first label, a first payload and a first internet protocol address and for receiving a control message including a second label, a second payload and a second internet protocol address, and a processor for executing the action in response to the first label corresponding to the action, the first internet protocol address corresponding to an expected internet protocol address of the first user system, the first payload corresponding to a first expected payload associated with the requested action, the second label corresponding to the action, the second internet protocol address corresponding to an expected internet protocol address of the second system, and the second payload corresponding to a first expected payload associated with the action.

20 Claims, 3 Drawing Sheets

(56) References Cited

U.S. PATENT DOCUMENTS

| | | | | | |
|---|---|---|---|---|---|
| 11,716,617 | B2 * | 8/2023 | Wentz | H04L 63/0807 | 713/168 |
| 2001/0047328 | A1 * | 11/2001 | Triola | G06Q 30/0613 | 705/50 |
| 2003/0046404 | A1 * | 3/2003 | O'Neill | H04L 69/08 | 709/228 |
| 2005/0257045 | A1 * | 11/2005 | Bushman | H04L 63/12 | 713/156 |
| 2007/0078762 | A1 * | 4/2007 | Triola | G06Q 40/00 | 705/1.1 |
| 2007/0094510 | A1 * | 4/2007 | Ross | G06Q 20/02 | 713/178 |
| 2007/0198406 | A1 * | 8/2007 | Bishop | G06Q 20/04 | 705/40 |
| 2008/0281649 | A1 * | 11/2008 | Morris | G06Q 40/12 | 705/30 |
| 2009/0025087 | A1 * | 1/2009 | Peirson, Jr. | G06Q 10/00 | 713/193 |
| 2012/0198570 | A1 * | 8/2012 | Joa | G06F 21/6218 | 726/30 |
| 2012/0233080 | A1 * | 9/2012 | Triola | G06Q 30/06 | 705/316 |
| 2015/0348038 | A1 * | 12/2015 | Femrite | G06Q 20/4014 | 705/44 |
| 2016/0180318 | A1 * | 6/2016 | Brooks | G06Q 20/10 | 705/39 |
| 2018/0225788 | A1 * | 8/2018 | Cook | G06Q 20/042 | |
| 2018/0240107 | A1 * | 8/2018 | Andrade | G06Q 20/065 | |
| 2018/0240208 | A1 * | 8/2018 | Cook | G06Q 30/06 | |
| 2019/0394176 | A1 * | 12/2019 | Haldenby | H04L 9/14 | |
| 2020/0201846 | A1 * | 6/2020 | Yang | H04L 9/3239 | |
| 2021/0166333 | A1 * | 6/2021 | Cook | G06Q 20/4014 | |
| 2022/0158855 | A1 * | 5/2022 | Wentz | H04L 9/3247 | |
| 2023/0139343 | A1 * | 5/2023 | Patra | G06F 21/64 | 705/74 |

* cited by examiner

TWO PERSON CONTROL WHERE BOTH PARTIES ARE GEOGRAPHICALLY DISTRIBUTED

TECHNICAL FIELD

The present disclosure generally relates to computer access control, and more particularly relates to methods and apparatus for providing some implementations for efficient two-person asset control in a zero-trust architecture in a computing environment.

BACKGROUND

Computer network security is essential for protecting data and privacy, maintaining system functionality, and building trust and confidence for network users. One common method of protecting network security is computer access control (CAC). CAC is a fundamental security principle that regulates who or what can access and use resources within a computer system. CAC acts as a gatekeeper, ensuring that only authorized users and programs gain access to specific information, systems or functionalities. CAC works to identify the user, authenticate the user, authorize access or permissions to the user and then enforces the authorization decision, allowing or denying access based on the established rules.

Geographical distribution can present unique challenges when securing computer access control. One major hurdle is latency and network reliability. Time delays associated with geographically dispersed users can create difficulties with real-time authentication methods like two-factor authentication, potentially impacting user experience and even hindering access altogether. Network outages or connectivity issues further complicate matters, potentially locking out authorized users at critical moments. In particular two-person control of a network server or application with geographical distribution of users introduces several security vulnerabilities to computer access control, especially when malicious actors can intercept and alter communication. With two points of access geographically separated, attackers have more opportunities to exploit weaknesses and interception points like communication channels, remote servers, or individual devices become potential targets for compromising the authentication process. Malicious actors can intercept communication between the two users controlling access and a server performing the function, masquerading as one of them to bypass authentication or alter control commands. This can grant unauthorized access or lock out legitimate users. It is desirable to address these problems to create systems and techniques for efficiently and securely providing multi-party access and control where each of the parties is geographically distributed. Other desirable features and characteristics will become apparent from the subsequent detailed description and the appended claims, taken in conjunction with the accompanying drawings and this background of the invention.

BRIEF SUMMARY

Disclosed herein are various electronic systems and related control logic for provisioning electronic map generation systems, methods for making and methods for operating such systems. By way of example, and not limitation, there is presented a computing system which may be provided to computer access control, and more particularly relates to methods and apparatus for providing some implementations for efficient two-person asset control in a zero-trust architecture in a computing environment.

In accordance with an aspect of the present disclosure, a distributed computing system for providing a two party computer access control, the method including a user system for generating an initiate message for requesting an execution of an action by a remote system and transmitting the initiate message to the remote system, the initiate message including a first label, a first payload and a first internet protocol address, a control system for generating a control message for confirming execution of the action by the remote system and transmitting the control message to the remote system, the control message including a second label, a second payload and a second internet protocol address, and a remote system configured for receiving the initiate message, receiving the control message and for executing the requested in response to the first label corresponding to the requested action, the first internet protocol address corresponding to an expected internet protocol address of the user system, the first payload corresponding to a first expected payload associated with the requested action, the second label corresponding to the requested action, the second internet protocol address corresponding to an expected internet protocol address of the control system, and the second payload corresponding to a first expected payload associated with the requested action.

In accordance with another aspect of the present disclosure, a method performed by a remote system for providing a two party computer access control on a distributed computing system including receiving an initiate message requesting an execution of an action from a user system, the initiate message including a first label, a first payload and a first internet protocol address, receiving a control message for authorizing execution of the action from a control system and for executing the action; the control message including a second label, a second payload and a second internet protocol address, and executing the action in response to the first label corresponding to the action, the first internet protocol address corresponding to an expected internet protocol address of the user system, the first payload corresponding to a first expected payload associated with the requested action, the second label corresponding to the action, the second internet protocol address corresponding to an expected internet protocol address of the control system, and the second payload corresponding to a first expected payload associated with the action.

In accordance with another aspect of the present disclosure, a system for performing a two party computer access control algorithm including a network interface for receiving, from a first user system, an initiate message requesting an execution of an action, the initiate message including a first label, a first payload and a first internet protocol address and for receiving, from a second user system, a control message for authorizing execution of the action, the control message including a second label, a second payload and a second internet protocol address, and a processor for executing the action in response to the first label corresponding to the action, the first internet protocol address corresponding to an expected internet protocol address of the first user system, the first payload corresponding to a first expected payload associated with the requested action, the second label corresponding to the action, the second internet protocol address corresponding to an expected internet protocol address of the second system, and the second payload corresponding to a first expected payload associated with the action.

Other embodiments may variously include software program products, digital storage media and/or other apparatus incorporating structures and/or techniques described herein. Additional detail about various embodiments is set forth below.

BRIEF DESCRIPTION OF THE DRAWINGS

The present invention will hereinafter be described in conjunction with the following drawing figures, wherein like numerals denote like elements.

DETAILED DESCRIPTION

The following detailed description of the invention is merely exemplary in nature and is not intended to limit the invention or the application and uses of the invention. Furthermore, there is no intention to be bound by any theory presented in the preceding background of the invention or the following detailed description of the invention.

Figure 1:
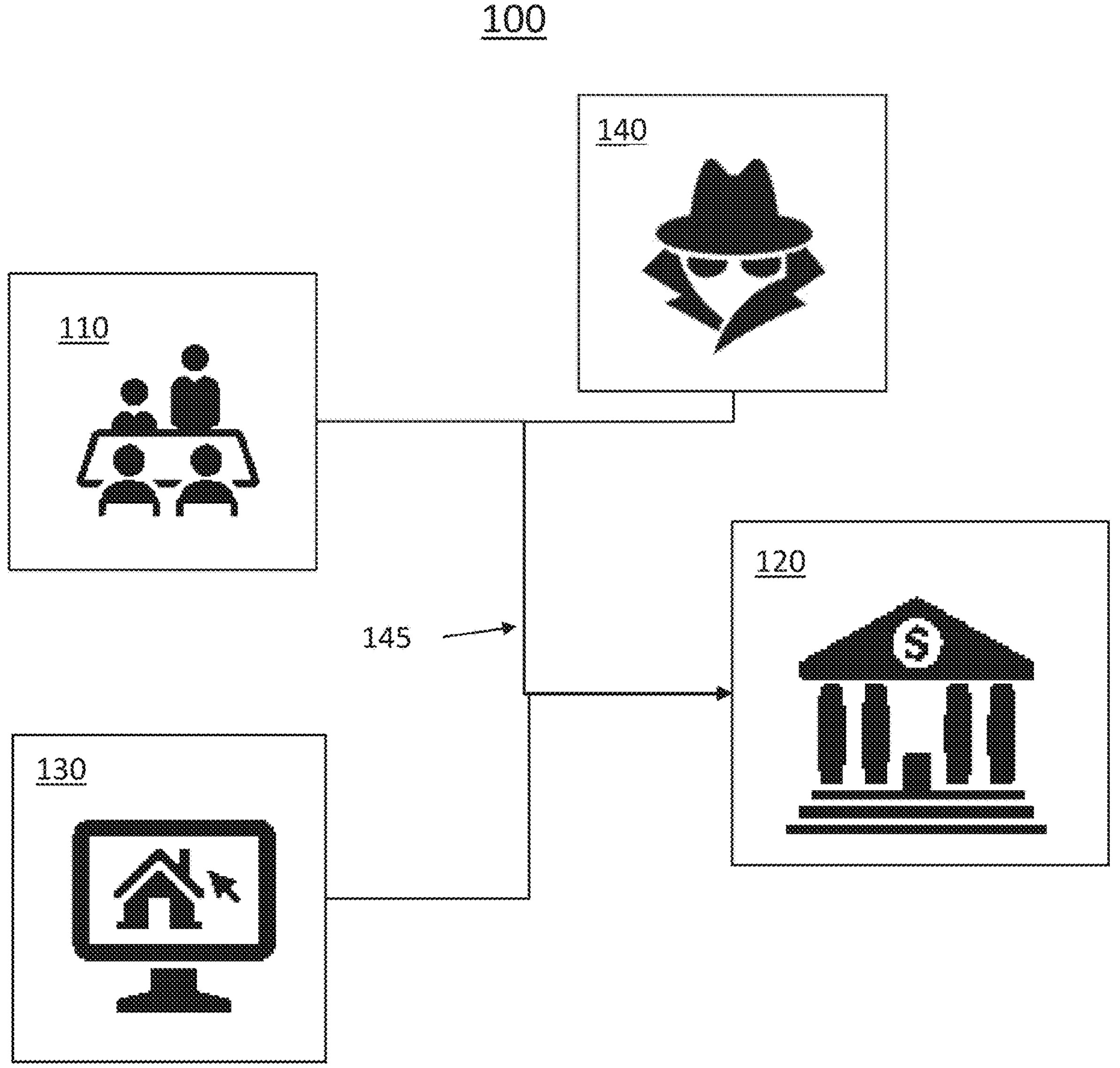
FIG. 1 shows an exemplary environment for use of two person computer access control where both parties are geographically distributed according to exemplary embodiments of the present disclosure.

With reference now to FIG. 1, an exemplary environment 100 for use of a two person computer access control where both parties are geographically distributed according to exemplary embodiments of the present disclosure is shown. In this exemplary environment, a financial transaction is taking place, such as a real estate transaction including a transfer of property and funds.

In this exemplary environment 100, the initiator 110 can be a first party for facilitating a financial transaction between two parties, such as a real estate broker facilitating a transfer or property and funds between a buyer and seller. The initiator 110 can first establish a data connection via a communications network 145 with a remote system 120, such as a bank. In some exemplary embodiments, the data connection can require multi-factor authentication (MFA) to establish the connection between the initiator 110 and the remote system 120. Likewise, the data connection can use zero trust network access (ZTNA) which is an approach that assumes no users or devices are inherently trustworthy. ZTNA requires users to authenticate themselves before they can access any resources on the network. With ZTNA, trust is granted dynamically based on continuous verification of identity, context, and device posture. ZTNA can be used to isolate the command paths to mitigate the potential of crossed data or unauthorized access when enabling two-person control across a geographic distance where a malicious actor 140 may be in the communication path to intercept and potentially alter the message traffic.

Once the data connection is established, the initiator 110 can transmit a message to the remote system 120 to request an action, such as transfer of funds from one party to another. In some exemplary embodiments, the message can be transmitted in response to execution of an executable on the system of the initiator 110. For some applications, the executable can be executed during the initiator 110 system startup. The message can have a specified payload and can include a common IP security option (CIPSO) label and a domain of interpretation (DOI). This CIPSO DOI label can be used to maintain separation from the control system of the remote system 120. In some exemplary embodiments, the remote system 120 will only accept messages having a label that matches a label expected by the remote system and/or will only accept a message from an IP address that is expected. Once the remote system 120 receives the message from the initiator 110, the remote system 120 determines the payload of the message and if the initiator 110 is authorized to transmit the message and request the action associated with the payload. If the initiator 110 is authorized, the remote system 120 then waits for a control message from a controller 130.

The controller 130 can be a separate user that is geographically separate from the initiator 110. According to the example, the controller 130 can be a title company. Once the controller 130 is aware that the initiator 110 has transmitted the message to the remote system 120, the controller 130 can transmit a message to the remote server 120 authorizing the requested action. In some exemplary embodiments, the controller 130 can become aware of the initiated action request in response to receiving the message from the initiator 110 and/or in response to a request from the remote system 120. Upon confirmation that the initiator 110 has transmitted the message requesting a transfer of funds, the controller 130 can transfer title of the property between the two parties. Once the transfer is executed, the controller 130 can transmit a message to the remote system 120 authorizing the transfer of funds. Like the message from the initiator 110, the message from the controller 130 can be transmitted via a secure network and can be transmitted in response to an execution of an executable on the system of the controller 130. When the remote server 120 receives the message, the remote server 120 can determine that the message is from an expected IP address, that a CIPSO DOI label matches an expected label and that the payload is an expected payload. Once the message is confirmed authentic from the controller 130, the remote system 120 performs the requested action, such as the transfer of funds between the two parties.

The exemplary transaction is illustrative of an application where there is a two-person rule, two-person integrity, or dual authorization. Examples of these applications can include moving large sums where two parties must authorize the sum and the financial institute acting as the "AND gate" by collecting the inputs and putting a condition that must be satisfied to complete the transaction. This occurs similarly in a real estate transaction where the buyer and seller set their terms and completion of the action through a financial institute results in moving a substantial sum of money. In addition, the system can be used for authorizing a high-risk action, such as access to a valuable resource or granting access to sensitive equipment or data, where two credentials are validated by a third party acting as the AND gate by putting conditions on granted access.

Figure 2:
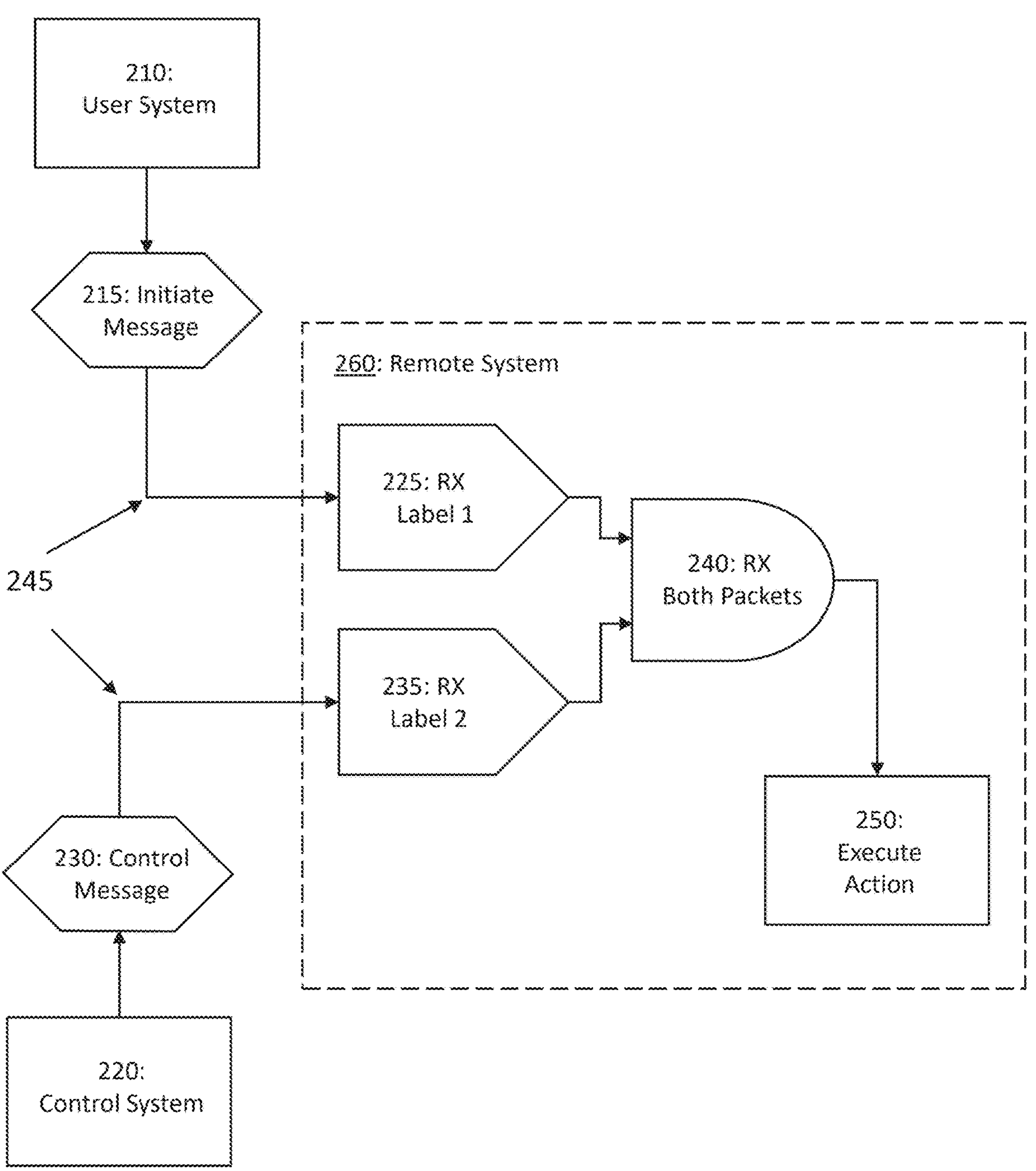
FIG. 2 is a block diagram showing a system for use of two person computer access control where both parties are geographically distributed according to exemplary embodiments of the present disclosure.

Turning now to FIG. 2, an exemplary system 200 for use of two-person computer access control where both parties are geographically distributed according to exemplary embodiments of the present disclosure is shown. The exemplary control arrangement is first initiated at a user system 210. In some exemplary embodiments, the user system 210 can use security-enhanced Linux (SELinux) or any operating system that enforces mandatory access control (MAC) while also being label aware. The user system 210 can execute a software application for generating a message for transmission to the remote system 260.

The initiate message 215 is generated by the user system 210 and is transmitted via a communication network 245. The initiate message 215 is transmitted from the user system 210 to the remote system 260 via the communications network 245. In some exemplary embodiments, the initiate message 215 is generated in response to an algorithm or software program executed by a user at the user system 210. The initiate message 215 includes a label, such as a CIPSO DOI label and a payload, and can include an indication of an IP address of the user system 210.

The communications network 245 is configured to couple the message from the user system 210 to the remote system 260. The remote system 260 is then first configured to determine if the label matches an expected label 225 if the label is an expected label. The remote system 260 can then determine if the message is from an expected IP address corresponding to the user system 210 and if the payload of the message is an expected payload. If the payload and/or IP address is expected, the remote system 260 can store data indicative of the request for action from the user system 210.

The exemplary system 200 is next configured with a control system 220 for confirming the requested action from the user system 210. The control system 220 can generate a control message 230 in response to a user request wherein the control message may be generated by a software executable on the control system 220. The control message 230 can be indicative of the confirmation of the requested action and may include a payload, the IP address of the control system 220, an IP address of the control system 220 and/or a CIPSO DOI label. The control message 230 is coupled from the control system 220 to the remote system 260 via the communication network 245. The control message 230 can then be received at the control system 260.

In response to receiving the control message 230 at the remote system, The remote system 260 determines if the CIPSO DOI label of the control message 230 matches an expected label 235. If the label is an expected label. The remote system 260 can then determine if the message is from an expected IP address corresponding to the control system 220 and if the payload of the message is an expected message. If the payload and/or IP address is expected, the remote system 260 can store data indicative of the confirmation of the request for action from the control system 210.

In some exemplary embodiments, the remote system 260 can at some point confirm if the initiate message 215 is received before the control message 230. If the control message 230 is received before the initiate message 215, the control message 230 is discarded. If both payloads are received 240 and authenticated by the remote system 260 and the control message 230 is received after the initiate message 215 the remote system can next execute 250 the requested action.

Figure 3:
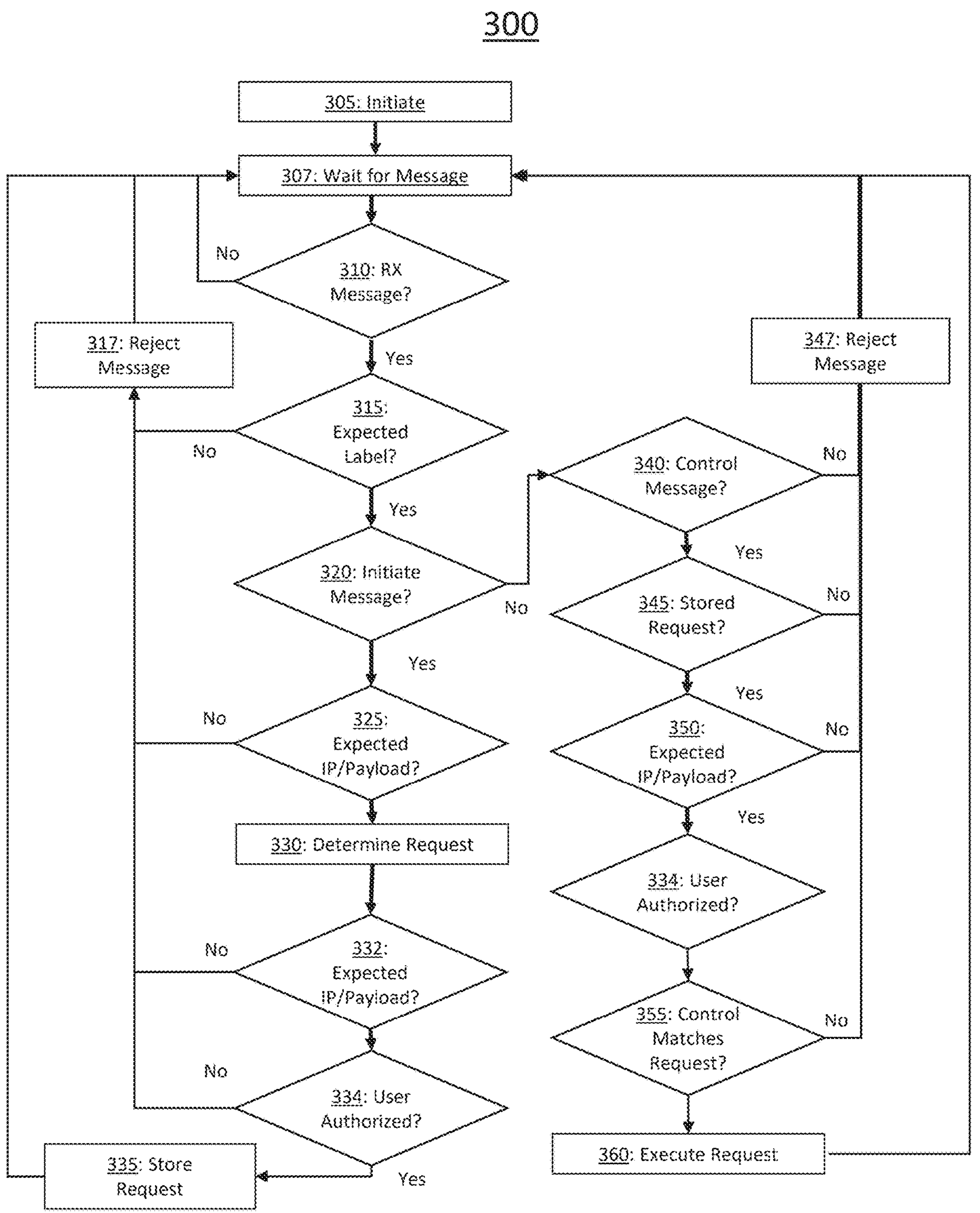
FIG. 3 is illustrative of a flowchart of an exemplary technique for use of two person computer access control where both parties are geographically distributed according to exemplary embodiments of the present disclosure.

As shown in FIG. 3, an exemplary method 300 for two-person computer access control where both parties are geographically distributed according to exemplary embodiments of the present disclosure is shown. The exemplary method 300 is suitably performed by a system communicatively coupled to a communications network and wherein the system is configured to execute an application where there is a two-person rule, two-person integrity, or dual authorization required. The exemplary method 300 is applicable to any application for receiving a request message from a first user and a confirmation message from a second user wherein the first user and the second user can be geographically distributed.

Method 300 is first operative to initiate 310 the application. Initiating the application can include preparing an interface to a communications network to receive messages from the communications network. In some exemplary embodiments, initiation of the application can occur in response to a request from a user, such as a telephone request, text message, or email, informing the system and/or system operator that a request may be generated by the user.

The method 300 next monitors 307 for incoming messages from the communications network. If no message is received 310, the method 300 returns to monitoring for messages 307. If 310 a message is received, the method 300 next determines if 315 the message has an expected label. The label can be a CIPSO DOI label or the like. If the label does not match the expected label, the message is rejected 317 and the method 300 returns to waiting for a subsequent message 307. If the label does match the expected label, the method 300 next determines if the message is an initiate message 320. If the message is an initiate message 320, the method 300 next determines if the payload and/or the IP address of the message sender match an expected payload and/or IP address 332. If the payload and/or IP address does not match expected values 332, the method 300 rejects the message 317 and returns to waiting for a subsequent message 307. If the payload and/or IP address matches the expected values 332, the method 300 next determines if the user is authorized to request the requested action 334. If the user is not authorized to request the requested action 334, the method 300 rejects the message 317 and returns to waiting for a subsequent message 307. If the user is authorized to request the requested action 334, the method stores the request 335 and returns to waiting for a subsequent message 307.

If the received message is not an initiate message 320, the method 300 next determines if the message is a control message 340. If the message is not a control message 340, the method 300 rejects the message 347 and returns to waiting for a subsequent message 307. If the message is determined to be a control message 340, the method 300 next determines if there is a stored request 345 from a previously received initiate message. If no request has been stored 345, indicating no prior authorized initiate message, the method 300 rejects the message 347 and returns to waiting for a subsequent message 307. If a request has been previously stored 345, the method 300 next determines if the control message includes the expected IP address and/or payload. If the expected IP address and/or expected payload are not indicated by the control message, the method 300 rejects the message 347 and returns to waiting for a subsequent message 307. If the expected IP address and/or payload are indicated by the control message 350, the method 300 next determines if the user is authorized to authorize the requested action 334. If the user is not authorized to authorize the requested action 334, the method 300 rejects the message 347 and returns to waiting for a subsequent message 307. If the user is authorized to authorized the requested action 334, the method 300 next confirms if the control authorization matches the initiated action 355. If the control authorization does not match 355 the initiated action 355, the method 300 rejects the message 347 and returns to waiting for a subsequent message 307. If the control authorization matches 355 the initiated action 355, the method 300 next executes the request 360 and returns to waiting for subsequent messages 307.

Generally speaking, each of the various steps in method 300 may be performed by any sort of computational hardware, firmware and/or software executing in any environment. In an exemplary embodiment, method 300 is implemented in software instructions that are associated with conventional processing that can be stored in memory or in any other mass storage, and that can be executed on any processor (e.g., any sort of conventional microprocessor, microcontroller, digital signal processor or the like, or any computing system based upon any sort of processor or controller). Other embodiments may be implemented in dedicated processing hardware, firmware and/or other means as desired, including any sort of common gate array, ASIC, or other programmed or programmable digital logic as desired. Some embodiments of the techniques and systems described in FIGS. 2-3, for example, may be very efficiently implemented using FPGA or other CGA structures, although other embodiments may use other types of hardware, firmware and/or software as desired.

The general concepts set forth herein may be readily applied in any number of equivalent settings beyond the stated uses and techniques. Various systems and techniques for processing data are therefore described. These techniques and systems may be variously applied in any military, commercial, personal or other setting for cryptographic or other network security purposes. Any number of modifications and enhancements could be formulated from the various examples described herein.

As used herein, the word "exemplary" means "serving as an example, instance, or illustration". "Exemplary" embodiments are not intended as models to be literally duplicated, but rather as examples that provide instances of embodiments that may be modified or altered in any way to create other equivalent embodiments. Any implementation described herein as "exemplary" is not necessarily to be construed as preferred or advantageous over other implementations.

While the foregoing detailed description will provide those skilled in the art with a convenient road map for implementing various embodiments of the invention, it should be appreciated that the particular embodiments described above are only examples, and are not intended to limit the scope, applicability, or configuration of the invention in any way. Various changes may be made in the function and arrangement of elements described without departing from the scope of the invention and its legal equivalents.

What is claimed is:

1. A distributed computing system for providing a two party computer access control in a zero-trust architectue comprising:

a user system comprising a processor and a label-aware operating system configured to enforce mandatory access control (MAC) for generating an initiate message for requesting an execution of an action by a remote system and transmitting the initiate message to the remote system, via a secure data connection, the initiate message including a first Common IP Security Option (CIPSO) domain of interpretation (DOI) label, a first payload and a first internet protocol address;

a control system geographically distributed from the user system and configured to enforce MAC for generating a control message for confirming execution of the action by the remote system and transmitting the control message to the remote system, the control message including a second CIPSO DOI label, a second payload and a second internet protocol address; and a remote system comprising a memory and a processor, the remote system communicatively coupled to the user system and the control system via a communications network and configured for:

receiving the initiate message and storing data indicative of the action in the memory;

receiving the control message;

verifying a temporal sequence of the messages, wherein the control message is discarded if the remote system determines that the control message was received before the initiate message; and executing the action only in response to:

the first CIPSO DOI label and the second CIPSO DOI label matching at least one expected label stored at the remote system;

the first internet protocol address corresponding to an expected internet protocol address of the user system;

the first payload corresponding to a first expected payload associated with the action, the second internet protocol address corresponding to an expected internet protocol address of the control system, and the second payload corresponding to the first expected payload associated with the action.

2. The distributed computing system of claim 1 wherein the control system is geographically distributed from the user system and the remote system.

3. The distributed computing system of claim 1 wherein the action is executed in response to the initiate message being received by the remote system before the control message is received by the remote system.

4. The distributed computing system of claim 1 wherein the first payload is an initiator key.

5. The distributed computing system of claim 1 wherein the second payload is a controller key.

6. The distributed computing system of claim 1 wherein the user system is further configured to establish a secure network connection with the remote system before transmitting the initiate message.

7. The distributed computing system of claim 1 wherein the control system is further configured to establish a secure network connection with the remote system before transmitting the control message.

8. The distributed computing system of claim 1 wherein the first CIPSO DOI label is used to maintain separation from the control system of the remote system.

9. The distributed computing system of claim 1 wherein the remote system is further configured to store the request for the execution of the action in a memory until the control message is received.

10. A method performed by a remote system for providing a two party computer access control in a zero trust architecture on a distributed computing system comprising:

receiving, via a secure data connection, an initiate message requesting an execution of an action from a user system comprising a processor and a label-aware operating system configured to enforce mandatory access control (MAC), the initiate message including a first Common IP Security Option (CIPSO) domain of interpretation (DOI) label, a first payload and a first internet protocol address;

storing, by the remote system comprising a memory and a processor, data indicative of the action;

receiving a control message for authorizing execution of the action from a control system geographically distributed from the user system and configured to enforce MAC, the control message including a second CIPSO DOI label, a second payload and a second internet protocol address;

verifying a temporal sequence of the messages, wherein the control message is discarded if the remote system determines that the control message was received before the initiate message; and executing, by the remote system including a memory and a processor, the action in response to:

the first CIPSO DOI label and the second CIPSO DOI label matching at least one expected label stored at the remote system;

the first internet protocol address corresponding to an expected internet protocol address of the user system;

the first payload corresponding to a first expected payload associated with the action, the second internet protocol address corresponding to an expected internet protocol address of the control system, and the second payload corresponding to the first expected payload associated with the action.

11. The method performed by a remote system for providing the two party computer access control in the zero trust architecture on the distributed computing system of claim 10 wherein the remote system is geographically distributed from the user system and the control system.

12. The method performed by a remote system for providing the two party computer access control in the zero trust architecture on the distributed computing system of claim 10 wherein the first payload is an initiator key.

13. The method performed by a remote system for providing the two party computer access control in the zero trust architecture on the distributed computing system of claim 10 wherein the initiate message and the control message are transmitted via a wireless network.

14. The method performed by a remote system for providing the two party computer access control in the zero trust architecture on the distributed computing system of claim 10 wherein the action is not executed in response to the remote system receiving the control message before the initiate message.

15. The method performed by a remote system for providing the two party computer access control in the zero trust architecture on the distributed computing system of claim 10 wherein the initiate message is generated in response to a performance of an executable by the user system.

16. The method performed by a remote system for providing the two party computer access control in the zero trust architecture on the distributed computing system of claim 10 wherein the control message is generated in response to the control system receiving the initiate message from the user system.

17. The method performed by a remote system for providing the two party computer access control in the zero trust architecture on the distributed computing system of claim 10 wherein the control message is generated in response to a request from the remote system.

18. The method performed by a remote system for providing the two party computer access control in the zero trust architecture on the distributed computing system of claim 10 wherein the first payload is generated in response to a user key and the second payload is generated in response to a control key.

19. A system for performing a two party computer access control algorithm in a zero-trust architecture comprising:

a network interface configured to enforce mandatory access control (MAC) for receiving, from a first user system via a secure data connection, an initiate message requesting an execution of an action, the initiate message including a first Common IP Security Option (CIPSO) domain of interpretation (DOI) label, a first payload and a first internet protocol address and for receiving, from a second user system geographically distributed from the first user system, a control message for authorizing execution of the action, the control message including a second CIPSO DOI label, a second payload and a second internet protocol address; and a processor for executing the action in response to:

verifying a temporal sequence of the messages, wherein the control message is discarded if the control message was received before the initiate message;

the first CIPSO DOI label and the second CIPSO DOI label matching at least one expected label stored at the remote system;

the first internet protocol address corresponding to an expected internet protocol address of the first user system;

the first payload corresponding to a first expected payload associated with the action, the second internet protocol address corresponding to an expected internet protocol address of the second user system, and the second payload corresponding to the first expected payload associated with the action.

20. The system for performing the two party computer access control algorithm in the zero trust architecture of claim 19 further comprising a memory for storing the initiate message and wherein the control message is disregarded in response to the initiate message not being received and stored in the memory before a receipt of the control message.

* * * * *